United States Patent [19]

Kaplan et al.

[11] Patent Number: 5,031,134

[45] Date of Patent: Jul. 9, 1991

[54] SYSTEM FOR EVALUATING MULTIPLE INTEGRALS

[75] Inventors: Wilfred Kaplan; Frederick B. Sleator, both of Ann Arbor, Mich.

[73] Assignee: The University of Michigan, Ann Arbor, Mich.

[21] Appl. No.: 499,758

[22] Filed: Mar. 27, 1990

Related U.S. Application Data

[63] Continuation-in-part of Ser. No. 358,469, May 30, 1989, abandoned, which is a continuation of Ser. No. 4,364, Jan. 15, 1987, abandoned.

[51] Int. Cl.$^5$ .............................................. G06F 7/38
[52] U.S. Cl. ................................................. 364/733
[58] Field of Search ....................... 364/733, 736, 768

[56] References Cited

U.S. PATENT DOCUMENTS

| | | | |
|---|---|---|---|
| 3,676,656 | 7/1972 | Schmidt | 364/736 |
| 4,156,922 | 5/1979 | Majerski et al. | 364/736 |
| 4,246,642 | 1/1981 | Magill | 364/733 |
| 4,398,263 | 8/1983 | Ito | 364/733 |

OTHER PUBLICATIONS

Lovesing et al., "An All Digital Hybrid Computer", 1974 Conf. on Computer Systems & Technology, London, Eng., Oct., 1974, pp. 49–57.

Press et al., *Numerical Recipes The Art of Scientific Computing,* pp. 126–130, Cambridge Univ. Press, 1986.

*Primary Examiner*—Dale M. Shaw
*Attorney, Agent, or Firm*—Rohm & Monsanto

[57] ABSTRACT

A system for computing multiple integrals employs an algorithm which selects a plurality of predetermined parameters, corresponding to selectable levels of accuracy of an approximation at the solution. The parameter values are selected and stored, along with a smoothing index, which may be zero. An arithmetic logic unit, which can perform a variety of functions under control of an instruction decoder, forms a plurality of functions in the form of unique polynomials, under predetermined conditions, such that a value (SI) can be determined for the multiple integral. The parameters are selected in response to a judgment on the part of the user of a required minimum level of accuracy in the context of the increases in computing time which would be required to achieve higher levels of accuracy.

13 Claims, 2 Drawing Sheets

FLOW DIAGRAM FOR INTEGRATION ALGORITHM

CIRCUIT DIAGRAM

SYSTEM FOR EVALUATING MULTIPLE INTEGRALS

RELATIONSHIP TO OTHER PATENT APPLICATIONS

This application for United States Letters Patent is a continuation-in-part of United States Ser. No. 07/358,469, now abandoned, filed May 30, 1989 by the same inventors as herein and assigned to the same assignee as herein, which was a continuing application of United States Ser. No. 07/004,364, now abandoned, which was filed on Jan. 15, 1987, by the same inventors as herein and assigned to the same assignee as herein.

BACKGROUND OF THE INVENTION

This invention relates generally to computer systems, and more particularly, to a computational device that evaluates a multiple integral having two or more dimensions.

Multiple integrals are well known as having utility in a large variety of scientific and analytical situations, particularly in determining cumulative effects. The concept that forms the basis of multiple integration is directed toward producing a value of a multidimensional cumulative effect, including total content, total value, total benefit, etc. In scientific and analytical contexts, such totals are obtained with precision when a precise formula is available expressing the quantity that is present or can be expected in each small portion of a region under consideration.

In the specific illustration of applying multiple integration to the problem of determining total coal resources in a given area, illustratively the United States, a specific formula may be known in the form of a density, illustratively expressing the quantity of coal per square mile, or other small portion of the region being considered. In the case of coal, one can also consider the amount of coal at various depths below the surface and obtain a density in tonnage per cubic mile. The formula, or function, provides one number that corresponds to the coal density at each location. Thus, to describe such a location, one needs two numbers, illustratively latitude and longitude. It can therefore be said that the coal density is a function of two variables. However, if a third number is required, such as depth, the function would be of the type having three variables.

In practice, one often encounters functions or three, four, or more variables that are to be integrated. For example, the determination of the total production of a factory over a year is a complicated integration process. In such a process, the density corresponds to a rate of production under various conditions. Description of such a process may require a formula having up to seven variables, which may correspond to time, location in the factory, variable supplies of raw materials, variable power supply, etc. In this manner, one can be required to integrate a function of any number of variables.

If a formula is known precisely, one can occasionally apply mathematics in the discipline of integral calculus to determine the total, or integral. However, such a situation occurs only relatively rarely and one usually must apply "brute force" requiring either hand calculators or computers. A brute force approach to a specific example is illustrated by assuming the simple formula:

$$d = 7X + 2Y \text{ (tons per square mile)},$$

which represents the density of coal across a square field, one mile on each side, in terms of distances X and y from two adjacent sides. Here X and Y can be measured in miles. Thus, at the illustrative point where $X=0.62$ and $Y=0.73$, $$d = 7(0.62) + 2(0.73) = 5.80.$$

The foregoing evaluation of the formula indicates that, for a small piece of field around the point where $X=0.62$ and $Y=0.73$, one could expect to find $5.80 \times A$ tons, where A is the area of the piece. One then adds all these small contributions to find the total coal deposit beneath the field.

The foregoing method seems crude, but is the basis for all integration. Increasing accuracy is achieved by increasing the number of small pieces and decreasing the size of each piece. It is therefore evident that application of the brute force method to functions of three, four, or more variables results in a very rapid increase in the number of small pieces required for high accuracy.

It has long been known that accurate results can be obtained more quickly by using averages, or weighted averages, of function values at selected points. For example, assuming that a small square area is to be analyzed, $d_0$ is the density at the center of the square, $d_1, \ldots, d_4$ are the densities at the four corners, and $d_5, \ldots, d_8$ are the densities at the midpoints of the sides. Using Simpson's Rule, the weighted average in the form:

$$\frac{16d_0 + d_1 + d_2 + d_3 + d_4 + 4d_5 + 4d_6 + 4d_7 + 4d_8}{36}$$

results in a relatively accurate estimate of the average density over the square. One can obtain the total coal tonnage by multiplying the area of the field, which is one square mile in the specific example, by the average density obtained using Simpson's Rule.

It is, therefore, an object of this invention to provide a device for evaluating multiple integrals.

It is a further object of this invention to incorporate selected averaging rules in a device for evaluating multiple integrals.

It is another object of this invention to provide a device for evaluating multiple integrals which achieves a high degree of accuracy at relatively low cost.

It is also an object of this invention to provide a device which can evaluate multiple integrals of functions having up to 8 variables.

It is another object of this invention to provide a device for evaluating multiple integrals wherein a user can select a desired level of accuracy.

It is a still further object of this invention to provide a device to evaluate multiple integrals wherein a user can limit computing time in response to a cost-benefit analysis.

It is yet an additional object of this invention to provide a plurality of methods of operating a device for evaluating multiple integrals Wherein a plurality of solution sets are provided, each subsequent method producing a lower absolute error value when applied to a test function.

SUMMARY OF THE INVENTION

The foregoing and other objects are achieved by this invention, which is a device for evaluating a multiple integral, the multiple integral being of the type that operates on a function of the type $F(X_1, \ldots, X_N)$, having N dimensions, where $2 \leq N \leq 8$ and the region of integration is $0 \leq X_1 \leq 1, \ldots, 0 \leq X_N \leq 1$. In accordance with the invention, the device evaluates a multiple integral of the type which operates on a function $F(X_1, \ldots, X_N)$ having N dimensions, where $N \geq 2$, and the region of integration is given by $0 \leq X_1 \leq 1, \ldots, 0 \leq X_N \leq 1$. The multiple integral computing device is provided with a bus for transferring data bidirectionally. The bus is coupled to a read-only memory which contains, in a first portion thereof, a plurality of predetermined numerical value pairs, each such pair having a p value and a corresponding s value. The plurality of predetermined numerical value pairs are arranged in a plurality of groups of the numerical value pairs, each such group being associated with a respective degree of approximation of the evaluation of the multiple integral. The read-only memory further contains, in a second portion thereof, a plurality of predetermined whole number values $b_1, \ldots, b_N$, and p, where $0 < b_1 < p, \ldots, 0 < b_N < p$. Additionally, the read-only memory contains in a third portion thereof a plurality of function computing instructions for computing functions $G_m(X)$ and $H_m(X)$. A fourth portion of the read-only memory contains a plurality of executable instructions. An address selector is coupled to the bus and produces an address signal corresponding to a respective address of the read-only memory. An instruction decoder also is coupled to the bus, and receives an instruction from the read-only memory. In response to the instruction, the instruction decoder responsively selects and enables a source of data. The data from the selected and enabled source of data is transferred to the bus. An arithmetic logic unit, which is adapted to perform selected operations, is coupled at an operation selection input thereof to the instruction decoder for receiving an operation selection signal corresponding to a selected operation. The arithmetic logic unit is also coupled to the bus for delivering data thereto responsive to the operation selection signal.

In accordance with a method aspect of the invention, the invention includes the steps of:

selecting and storing a plurality of whole numbers N, s and p, where $0 < s < p$, $2 \leq N \leq 8$;

calculating and storing numbers $b_1, \ldots, b_N$ and $d_1, \ldots, d_N$ in accordance with the rules $b_i = \mathrm{mod}(s^{i-1}, p)$, $d_i = b_i = \mathrm{mod}(s^{i-1}, p)$, $d_i = b_i/p$, $i = 1, \ldots, N$;

receiving as input and storing a chosen function $F(X_1, \ldots X_N)$ to be integrated;

selecting and storing a smoothing index m in the form of a whole number, where $0 \leq m \leq 5$;

forming a plurality of functions $H_m(x)$, $G_m(x)$, where $H_0(x) = x$, $G_0(x) = 1$ and for $m \geq 1$, $H_m(x)$, $G_m(x)$ are the unique polynomials such that $G_m(x) = x^m \cdot (1-x)^m$, and $H_m'(x) = h_m \cdot G_m(x)$, $H_m(0) = 0$ and $h_m = (2m+1)!/(m!)^2$;

evaluating a number SI, in accordance with the formula $$SI = \sum_{k=1}^{p} F(J_m(kb_1/p), \ldots, J_m(kb_N/p)) \cdot K_m(kb_1/p) \ldots K_m(kb_N/p)$$

and a number Z in accordance with the formula $$Z = \sum_{k=1}^{p} K_m(kb_1/p) \ldots K_m(kb_N/p),$$

where $J_m(x) = H_m(FRC(x))$ and $K_m(x) = G_m(FRC(x))$;

calculating SI/Z as the value of the integral.

In some embodiments of the invention, the value of m is selected to be zero when $F(X_1, \ldots, X_N)$ satisfies the periodicity conditions $$F(0, X_2, \ldots, X_N) = F(1, X_2, \ldots, X_N)$$

$$F(X_1, 0, X_3, \ldots, X_N) = F(X_1, 1, X_3, \ldots, X_N)$$

$$F(X_1, \ldots, X_{N-1}, 0) = F(X_1, \ldots, X_{N-1}, 1).$$

For given $F(X_1, \ldots, X_N)$ and choice of m, the device can be used to calculate 10 successive approximate values of the integral, according the approximation numbers AP, where $AP = 1, 2, \ldots, 10$. Typically, the results are of increasing accuracy and increasing cost, and the user can decide to stop at $AP = k < 10$, thereby saving time and cost.

For chosen $F(X_1, \ldots, X_N)$ the device evaluates each of the 10 successive approximations of the integral by carrying out the following steps:

store N, $F(X_1, \ldots, X_N)$ and m, select p and s in accordance with N and the approximation number AP; calculate $b_1 = 1, b_2 = s, b_3 = \mathrm{mod}(s^2, p), \ldots, b_N = \mathrm{mod}(s^{N-1}, p)$, $d_1 = b_1/p, \ldots, d_N = b_N/p$;

initialize $X_1$ as $d_1$, $X_2$ as $d_2, \ldots, X_N$ as $d_N$; initialize SI as 0 and Z as 0; use the current values of $X_1, \ldots, X_N$, SI and Z to calculate:

$$\int_1^0 \ldots \int_1^0 F(X_1, \ldots, X_N) \cdot dX_1 \ldots dX_N.$$

then add $W \cdot F(Y_1, \ldots, Y_N)$ to SI and add W to Z to obtain new current values of SI and Z; replace the current values of $X_i, \ldots, X_N$ by $FRC(X_i + d_1), \ldots, FRC(X_N + d_N)$, respectively, as new current values of $X_1, \ldots, X_N$; after the last three steps have been repeated p times, the final values of SI and Z are used to calculate SI/Z.

BRIEF DESCRIPTION OF THE DRAWINGS

Comprehension of the invention is facilitated by reading the following detailed description in conjunction with the annexed drawings, in which.

DETAILED DESCRIPTION

Figure 1:
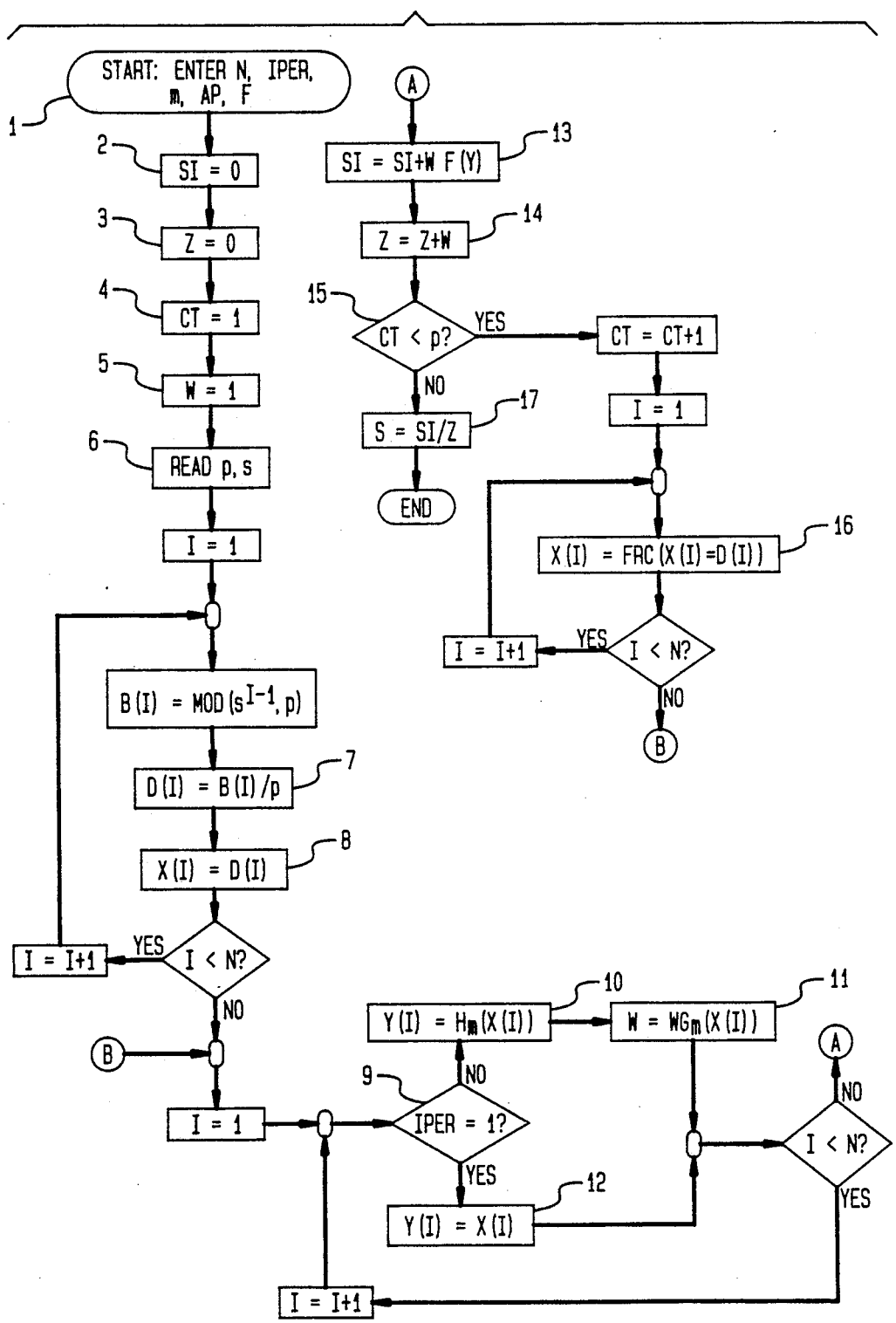
FIG. 1 is a block and line representation of one aspect of the present invention.

The present invention is useful in evaluating multiple integrals in N dimensions, in the form of $$\int_1^0 \ldots \int_1^0 F(X_1, \ldots, X_N) \cdot dX_1 \ldots dX_N.$$

A known algorithm for integration uses sets of whole numbers p, $b_1, \ldots, b_N$. Each such set provides an approximate value of the integral as the average value of $F(X_i, \ldots, X_N)$ at the p points $(FRC(kb_1/p), \ldots$ ,FRC($kb_N/p$)), $k=1, 2, \ldots, p$, where FRC() represents the fractional part of the quantity in parentheses: FRC(1.35)=0.35.

The system of the present invention has two major aspects:
1. A choice of sets p, $b_1, \ldots, b_N$ that give good accuracy;
2. A procedure for applying each set p, $b_1, \ldots, b_N$ for integration of an arbitrary function $F(X_i, \ldots, X_N)$ to yield high accuracy.

These two aspects are set forth with greater detail in the description herein, where use is made of the following terminology for whole numbers a, b, p, with p positive:

a=mod(b,p) means: $0 \leq a \leq p-1$ and a−b is divisible by p. For example, 1=mod(22,7), since 1 is between 0 and 6, inclusive, and $1-22=-21$, which is divisible by 7.

I. Choice of p, $b_1, \ldots, b_N$. For each $N=2, 3, \ldots, 8$, 10 choices of Pairs p, s were made and then $b_1, \ldots, b_N$ were chosen to be the numbers 1, s, mod($s^2$,p), $\ldots$, mod($s^{N-1}$,p). The pairs p, s were chosen, after a long and elaborate computational search, to yield numbers $b_1, \ldots, b_N$ giving high-accuracy in integration. In particular, they give decreasing absolute error as the approximation number increases from 1 to 10 when the device is used to integrate the test function $F=Q(X_1) \cdot \ldots \cdot Q(X_N)$, where $Q(x)=7/6-x+x^2$.

II. Smoothing Process. It is known that the error in approximating the integral $$\int_1^0 \ldots \int_1^0 F(X_1, \ldots, X_N) \cdot dX_1 \ldots dX_N.$$

by the sum $$S = (1/p) \cdot \sum_{k=1}^{p} F(FRC(kb_1/p), \ldots, FRC(kb_N/p))$$

is equal to the sum of certain Fourier coefficients of F and that the more rapidly these coefficients decrease, with increasing index, the better the approximation. Hence, the present invention includes a process to replace $F(X_1, \ldots, X_N)$ by a function $F_0(X_1, \ldots, X_N)$ with the same integral but whose Fourier coefficients decrease more rapidly.

The process can be made clear for functions of one variable. For $m=1, 2, \ldots$, $G_m(x)$ is the function $x^m \cdot (1-x)^m$ and $H_m(x)$ is the function such that $H_m'(x)=h_m \cdot G_m(x)$ and $H_m(0)=0$, where $h_m=(2m+1)!/(m!)^2$. From these properties one finds that $H_m(1)=1$. Accordingly, F(X) has the same integral as $$F_0(X)=F(H_m(X)) \cdot H_m'(X)=h_m \cdot F(H_m(X)) \cdot G_m(X).$$

Typically the Fourier coefficients of $F_0(X)$ approach 0 more rapidly than those of F(X); the larger the m, the more rapidly they approach 0.

For the general case, one has the same conclusions for $F_0(X_1, \ldots, X_N)=F(H_m(X_1), \ldots, H_m(X_N)) \cdot H_m'(X_1) \ldots H_m'(X_N)$. $F_0$ has the same integral as F and the Fourier coefficients of $F_0$ approach 0 more rapidly than those of F, especially for large m.

One is thus led to replace the sum S above by the same sum with F replaced by $F_0$ for some choice of m. However, this process has a flaw. If F is identically 1, the integral is 1 and the averaging process should also give 1, and that is not so for the sum S with F replaced by $F_0$. A modification eliminates the flaw; one replaces S by SI/Z, where:

$$SI = \sum_{k=1}^{p} F(H_m(FRC(kb_1/p)), \ldots, H_m(FRC(kb_N/p))) \cdot G_m(FRC(kb_1/p)) \ldots G_m(FRC(kb_N/p))$$

and $$Z = \sum_{k=1}^{p} G_m(FRC(kb_1/p)) \ldots G_m(FRC(kb_N/p)).$$

The result is a true weighted average of the values of F at p points. The process is termed smoothing of F.

If F has period 1 in all variables, the smoothing is usually not needed. Here one is assuming that F is continuous and that F satisfies at least the conditions $F(0, X_2, \ldots, X_N)=F(1, X_2, \ldots, X_N)$. $F(X_1, 0, X_3, \ldots, X_N)=F(X_1, 1, X_3, \ldots, X_N)$ and so on and preferably that such conditions are also satisfied by the N first derivatives of F, also assumed continuous. The reason is that such periodic functions already have Fourier coefficients approaching zero rather rapidly. It is convenient to describe the omission of smoothing by m=0, so that $G_0(X)=1$ and $H_0(X)=X$. In the algorithm below, IPER=1 if m=0 and IPER=0 otherwise.

The following algorithm illustrates how the procedures described can be implemented to integrate a given $F(X_1, \ldots, X_N)$.

INTEGRATION ALGORITHM

Figure 2:
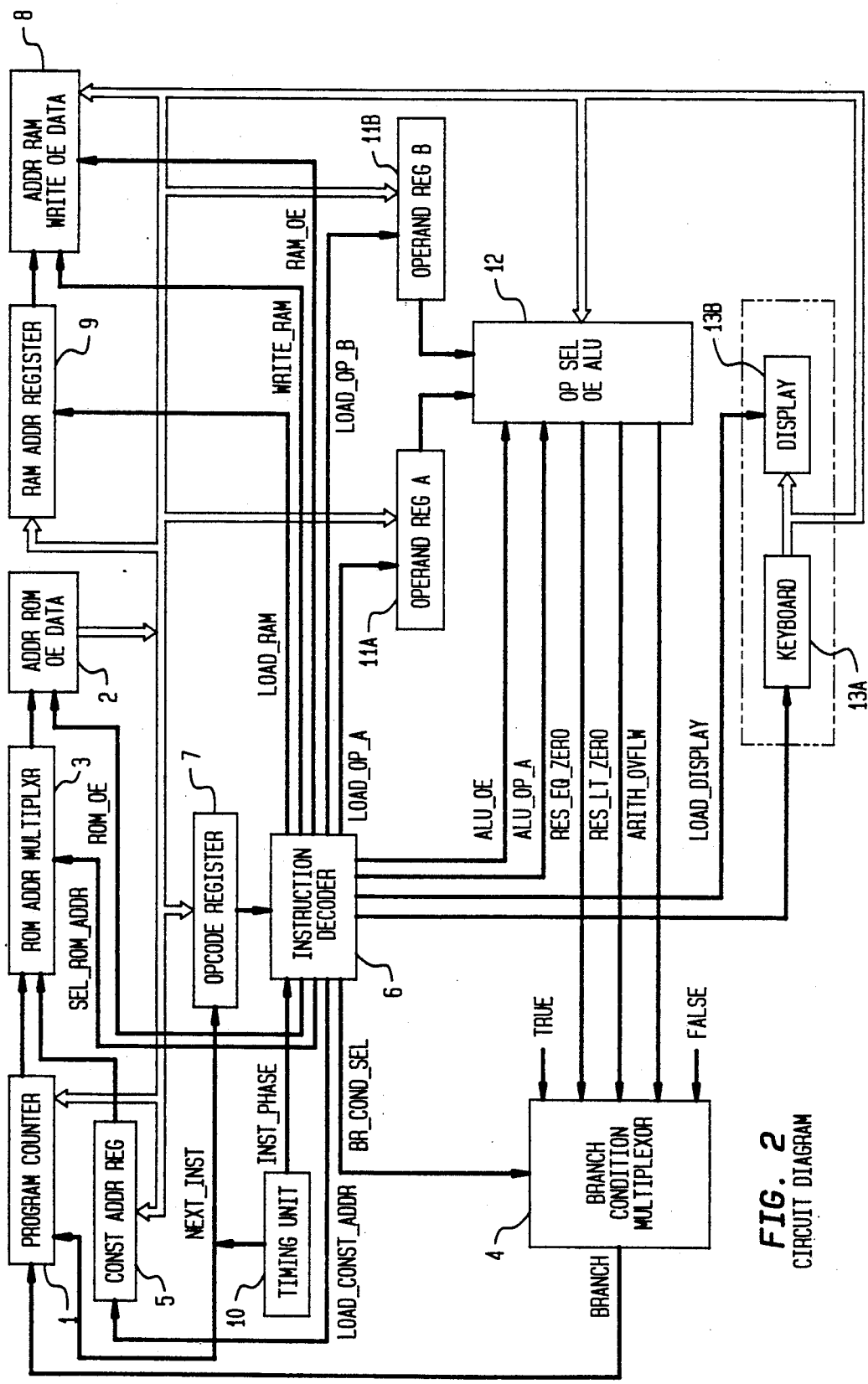
FIG. 2 is a block and line representation of a second aspect of the present invention.

The following is a step-by-step exposition of the algorithm corresponding approximately to the flow diagram shown in FIG. 1. Numbers in parentheses refer to the elements shown in the circuit diagram (FIG. 2). Box numbers refer to the numbered steps as shown in the flow diagram.

(1) A mode switch in the input element (13A) is set to ENTER.

(2) Values are entered via the data entry keys for the dimension N ($2 \leq N \leq 8$), the periodicity index IPER (=0,1), the smoothing index m ($0 \leq m \leq 5$) and the approximation number AP ($1 \leq AP \leq 10$) (Box 1).

(3) The integrand function $F(X_1, \ldots, X_N)$ is entered via operation keys (Box 1). The program for computing the function has been stored previously in the read-only memory ROM (2).

(4) The mode switch is then set to EXECUTE.

(5) The SI and Z registers in the random-access memory RAM (8) are cleared and the CT and W registers in the RAM 2 are set to 1 (Boxes 2-5).

(6) The $D_i$ (i=1, $\ldots$, N) and p registers in the RAM (8) are loaded from the read-only memory ROM (2) with values from a table corresponding to the input values of N and AP (Boxes 6-7). (Addresses in the ROM are specified by a conditional signal generated in the branch condition multiplexer (4) in accordance with the input values of N and AF and the incremental index i, and supplied to the address section of the ROM.)

(7) The $X_i$ registers in the RAM are loaded with the corresponding values of $D_i$ for i=1, $\ldots$, N (Box 8).

(8) The periodicity index IPER is compared with 0 in the branch condition multiplexer (Box 9). If equality holds, the ROM delivers instructions required to compute N values of the function $H_m(X_i)$ and N values of $G_m(X_i)$, using the value of m input to the RAM. The values of $H_m(X_i)$ are computed successively in the arithmetic logic unit (12) according to formulas given elsewhere in this disclosure and stored in the H and $Y_i$ register of the RAM (Box 10). Those of $G_m(X_i)$ are computed in the ALU and stored in the G register of the RAM, then each is multiplied by the current content of the W register in the RAM and the result stored in W (Box 11). If IPER is not equal to 0, then the contents of the $X_i$ registers in RAM 2 are copied into the corresponding $Y_i$ registers (Box 12).

(9) The arguments $Y_i$ are used to compute a value of F according to the program stored in the RAM (2). The value of F is multiplied by the current value of W and the result is added to the current value of the SI register and the sum stored in SI (Box 13).

(10) The current value of W is added to that of Z and the result stored in Z (Box 14).

(11) The value of the counter CT is compared with that of p (Box 15). If CT<p, CT is incremented by 1, N new values of the function $FRC(X_1+D_i)$ are computed (here FRC(x) means the fractional part of x), using the current values of the $X_i$ and the constants $D_i$, and the results are stored in the $X_i$ registers (Box 16). Steps 8) through 11) are then repeated using the new values of the $X_i$. If CT=p, the current value of SI is divided by that of Z and the result is stored in the S register (Box 17) and displayed as the approximation number AP to the integral of the function F with smoothing index m (if aperiodic) over the unit hypercube.

HARDWARE COMPONENTS

An integrated circuit (chip) representing a possible realization of the invention would contain the following basic hardware elements, numbered in accordance with the accompanying diagram (FIG. 2).

1. Program Counter (PC). This provides address of instruction to Read-Only Memory (2). Normally this is incremented with every instruction cycle, but it can also be loaded from the data bus under control of the Branch Condition Multiplexor (4).

2. Read-Only Memory (ROM). This provides permanent storage of constant data and invariant instructions required to execute the algorithm. Among the items stored are the following:
   (a) Tables of values of p, $D_i=MOD(s^{i-1},p)/p$, i=1,...,N, for each of 10 approximations, for each N from 2 to 8. Explicit values of p and s to be used are listed in Table 1, at the end of this section.
   (b) Instructions for computing the functions $G_m(X)$, $H_m(X)$, for arbitrary X, for each integer value of m from 1 to 5.
   (c) Instructions for executing the algorithm outlined below, consisting of gate controls, next-address tables, etc.

3. ROM Address Multiplexor. This selects the pertinent address in the ROM in accordance with input from the PC (1), Constant Address Register (5) or Instruction Decoder (6).

4. Branch Condition Multiplexor. Selects which branch condition will affect the PC, based on the Branch Condition Select received from the Instruction Decoder. One input is a constant FALSE, meaning "Continue with next instruction; do not branch". Another input is a constant TRUE, meaning "Branch to the address now being supplied on the Data Bus, regardless of any other conditions". Remaining inputs, which can be arbitrary in number, are generally results from the Arithmetic Logic Unit (12), such as "Result equals zero", "A>B", "Arithmetic overflow", etc., or inputs from outside sources such as the Keyboard (13 A).

5. Constant Address Register. Provides a means of addressing constants stored in the ROM without disrupting the PC. Loaded from the PC, via the Data Bus, or from the Instruction Decoder, as directed by the opcode.

6. Instruction Decoder. Takes the opcode field of the current instruction and decides which control lines will enable the correct data source onto the Bus, which register should receive the data, etc.

7. Opcode Register. Stores opcode while the Data Bus is being used for other things. (This could be included in the Instruction Decoder.)

8. Random Access Memory (RAM). This stores the intermediate and final results generated in the Arithmetic Logic Unit. There are two control inputs: Read/Write and Output Enable (OE). In the "Write" state, data are taken from the Bus, overriding the OE control. In the "Read" state, the OE can be used to enable data onto the bus or leave it alone so other devices can use it.

9. RAM Address Register. This is analogous to the Constant Address Register (5) for the ROM.

10. Timing Unit. This might be labeled "Timing and Instruction Fetch". It defines the basic instruction cycle and provides timing signals to read the instructions out of ROM. It also provides timing signals to the Instruction Decoder so that the Decoder can order the transactions on the Data Bus. In particular, to fetch a new instruction, the Timing Unit provides a signal to the Instruction Decoder that causes it to select the PC as the source of the address delivered to the ROM. At the end of the instruction cycle, the Timing Unit sends a signal to the PC to increment or load it, as determined by the Load/Inc signal from the Branch Condition Multiplexor (4). 11 A and B. Operand Registers. These store the operands until the results from the Arithmetic Logic Unit can be received. Operands may come from anything that outputs data onto the Data Bus, e.g. instructions or constants from the ROM, variables in the RAM, or prior results generated in the ALU itself.

12. Arithmetic Logic Unit (ALU). This has an Operation Select input, which receives a coded value from the Instruction Decoder selecting which operation is to be performed, two operand inputs, a result output with an Output Enable, so that it can drive the Bus under control of the Instruction Decoder, and various result codes as described under "Branch Condition Multiplexor", above. Internal circuits required to do all the necessary operations for the present algorithm are standard and well known.

In addition to the above the circuit diagram shows two more elements, enclosed in dotted lines, which are not properly part of the integrated circuit board (chip). These are:

13 A. An input device such as a Keyboard, capable of entering data and operation instructions and containing a mode switch that toggles between the entry and execution modes. This is essentially a buffer that can enable data from the outside onto the Bus under program control. There is an instruction whose opcode is "Read keyboard", which enables data from the Keyboard onto the Bus and signals the proper receiver, e.g. the RAM or one of the Operand Registers (11 A,B), to accept it.

13 B. A Display Element, which displays the results of the integration in some readable form. This receives a signal from the Instruction Decoder that causes it to accept and display the current value on the Data Bus.

Central to the whole structure is a bidirectional Data Bus (shown as a heavy line in the diagram), onto which data can be driven by the ROM, the RAM, the ALU or the Keyboard. Each device that accepts data from the Bus has supplied to it a strobe signal which indicates that it should accept the data currently on the Bus. These strobe signals are generated by the Instruction Decoder on the basis of the data supplied to it from the Opcode Register (7).

Each instruction will have an "opcode" field and an "operand" field. As an example, to initialize a location in RAM with a constant from ROM, the first instruction would have "Load RAM Address Register" as its opcode and the value to be loaded into the RAM Address Register in its operand field. The "Load Ram Address Register" opcode would be decoded by the Instruction Decoder and would result in the load signal to the RAM Address Register being pulsed. The next instruction would have "Load RAM" as its opcode and the data to be put in RAM as its operand. This would cause the Instruction Decoder to set the RAM Read/Write control line to "Write", thus loading the data on the Bus from the operand field of the instruction into the addressed RAM cell.

At the beginning of each instruction cycle the Timing Unit enables the data from the ROM onto the bus and strobes the Instruction Register to capture the opcode portion of the instruction word. The Timing Unit can then signal the Instruction Decoder to enable other sources to drive data onto the Bus and other receivers to accept it, in order to complete the instruction.

The following is an explanation of the signals shown on the various lines of the diagram in abbreviated form:

TABLE 1

| AP | N | \multicolumn{7}{c}{Stored Values of p and s} |
|----|---|------|------|------|-------|-------|-------|-------|
|    |   | 2    | 3    | 4    | 5     | 6     | 7     | 8     |
| 1  | p | 39   | 14   | 89   | 341   | 532   | 211   | 123   |
|    | s | 14   | 3    | 37   | 151   | 87    | 63    | 44    |
| 2  | p | 73   | 52   | 146  | 923   | 855   | 781   | 408   |
|    | s | 27   | 9    | 63   | 196   | 259   | 243   | 127   |
| 3  | p | 119  | 112  | 449  | 1655  | 1745  | 1899  | 1632  |
|    | s | 50   | 31   | 92   | 786   | 373   | 485   | 53    |
| 4  | p | 233  | 209  | 857  | 2462  | 3145  | 2437  | 3955  |
|    | s | 89   | 45   | 188  | 1041  | 948   | 492   | 1877  |
| 5  | p | 389  | 403  | 1050 | 4207  | 6290  | 4201  | 5840  |
|    | s | 115  | 181  | 407  | 888   | 2937  | 1917  | 2253  |
| 6  | p | 900  | 892  | 1785 | 5342  | 7957  | 6553  | 6970  |
|    | s | 251  | 407  | 344  | 473   | 3823  | 2057  | 2979  |
| 7  | p | 1501 | 2331 | 2380 | 5962  | 9389  | 10295 | 14737 |
|    | s | 552  | 988  | 939  | 2881  | 3453  | 2039  | 1045  |
| 8  | p | 2059 | 2943 | 4440 | 7688  | 14209 | 18861 | 19618 |
|    | s | 782  | 1135 | 709  | 2495  | 1864  | 2914  | 1219  |
| 9  | p | 2477 | 3395 | 5856 | 10775 | 32489 | 31028 | 34306 |
|    | s | 915  | 1296 | 1087 | 2831  | 11789 | 6947  | 805   |
| 10 | p | 3466 | 3952 | 7937 | 27775 | 39034 | 48332 | 44738 |
|    | s | 1323 | 1551 | 3449 | 5086  | 6015  | 2139  | 1165  |

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A multiple integral computing arrangement for evaluating a multiple integral, the multiple integral being of the type which operates on a function $F(X_1, \ldots, X_N)$ having N dimensions, where $N \geq 2$, and the region of integration is given by $0 \leq X_1 \leq 1, \ldots,$

| ALU_Op_Sel | Multi-bit signal that selects the operation to be performed by the ALU. |
|---|---|
| Br_Cond_Sel | Multi-bit signal to select which input of the Branch Condition Multiplexor drives the Branch signal. |
| Branch | Output of the Branch Condition Multiplexor, selects whether the Problem Counter will be loaded from the Data Bus (TRUE) or incremented by the Next_Inst signal (FALSE). |
| Inst_Phase | Sequencing signal that orders insruction flow between Instruction Decoder and ROM. |
| Load_Const_Addr | |
| Load_Display | |
| Load_Opnd_A | These signal the corresponding register to receive the |
| Load_Opnd_B | data currently on the Bus |
| oad_RAR | |
| Next_Inst | Signals the beginning of a new instruction. |
| ALU_OE | |
| RAM_OE | Enable ALU/RAM/ROM output onto the Bus. |
| ROM-OD | |
| Read_Kbd | Enables data from the Keyboard onto the Bus. |
| Arith_Ovflw | |
| Res_Eq_Zero | Representative set of possible ALU result flags that |
| Res_Lt_Zero | can be used as branch conditions. |
| Sel_ROM)Addr | Selects the source of address for the ROM (e.g. TRUE selects the PC, FALSE selects the Constant Address Register). |
| Write_RAM | TRUE signals the RAM to load the data on the Bus into the location specified by the address input. |

The following table contains the particular values of the quantities p and s to be stored in the ROM. These determine the points in N-dimensional space at which the integrand is to be evaluated, as described in the algorithm outlined above.

$0 \leq X_N \leq 1$, the multiple integral computing arrangement comprising:
  bus means for transferring data bidirectionally;
  read-only memory means, coupled to said bus means, said read-only memory means containing in a first portion of said read-only memory means, a plurality of predetermined numerical value pairs, each such pair having a p value and a corresponding s value, said plurality of predetermined numerical value pairs being arranged in a plurality of groups of said numerical value pairs, each such group being associated with a respective degree of approximation of the evaluation of the multiple integral, said read-only memory means further containing in a second portion thereof a plurality of predetermined whole number values $b_1, \ldots, b_N$, and p, where $0<b_1<p, \ldots, 0<b_N<p$, said read-only memory means further containing in a third portion thereof a plurality of function computing instructions for computing functions $G_m(X)$ and $H_m(X)$ and read-only memory means further containing in a fourth portion thereof a plurality of executable instructions;

address selection means, coupled to said bus means, for producing an address signal corresponding to a respective address of said read-only memory means;

instruction decoder means, coupled to said bus means, for receiving an instruction from said read-only memory means, and for responsively selecting and enabling a source of data, data from said selected and enabled source of data being transferred to said bus means; and arithmetic logic means for performing selected operations, said arithmetic logic means being coupled at an operation selection input thereof to said instruction decoder means for receiving an operation selection signal corresponding to a selected operation, said arithmetic logic means being coupled to said bus means for delivering data thereto responsive to said operation selection signal.

2. The multiple integral computing system of claim 1 wherein said function computing instructions stored in said read-only memory means include further function computing instructions for computing said functions $G_m(X)$ and $H_m(X)$ for a plurality of smoothing index integer values, m, where $1 \leq m \leq 5$.

3. The multiple integral computing system of claim 1 wherein said address selection means comprises program counter means coupled to said read-only memory means for producing said address signal.

4. The multiple integral computing system of claim 3 wherein said address selection means further comprises:

constants address register means for producing said address signal corresponding to a respective address of said read-only memory means; and multiplexer means responsive to said instruction decoder means for coupling a selected one of said constants address register means and said program counter means to said read-only memory means.

5. The multiple integral computing system of claim 1 wherein said predetermined values stored in said read-only memory means, as correlated respective levels of approximation (AP), correspond substantially to:

| AP | | N = 2 | 3 | 4 | 5 | 6 | 7 | 8 |
|---|---|---|---|---|---|---|---|---|
| 1 | p | 39 | 14 | 89 | 341 | 532 | 211 | 123 |
|   | s | 14 | 3 | 37 | 151 | 87 | 63 | 44 |
| 2 | p | 73 | 52 | 146 | 923 | 855 | 781 | 408 |
|   | s | 27 | 9 | 63 | 196 | 259 | 243 | 127 |
| 3 | p | 119 | 112 | 449 | 1655 | 1745 | 1899 | 1632 |
|   | s | 50 | 31 | 92 | 786 | 373 | 485 | 53 |
| 4 | p | 233 | 209 | 857 | 2462 | 3145 | 2437 | 3655 |
|   | s | 89 | 45 | 188 | 1041 | 948 | 492 | 1877 |
| 5 | p | 389 | 403 | 1050 | 4207 | 6290 | 4201 | 5840 |
|   | s | 115 | 181 | 407 | 888 | 2937 | 1917 | 2253 |
| 6 | p | 900 | 892 | 1785 | 5342 | 7957 | 6553 | 6970 |
|   | s | 251 | 407 | 344 | 473 | 3823 | 2057 | 2979 |
| 7 | p | 1501 | 2331 | 2380 | 5962 | 9389 | 10295 | 14737 |
|   | s | 552 | 988 | 939 | 2881 | 3453 | 2039 | 1045 |
| 8 | p | 2059 | 2943 | 4440 | 7688 | 14209 | 18861 | 19618 |
|   | s | 782 | 1135 | 709 | 2495 | 1864 | 2914 | 1219 |
| 9 | p | 2477 | 3395 | 5856 | 10775 | 32489 | 31028 | 34306 |
|   | s | 915 | 1296 | 1087 | 2831 | 11789 | 6947 | 805 |
| 10 | p | 3466 | 3952 | 7937 | 27775 | 39034 | 48332 | 44738 |
|    | s | 1323 | 1551 | 3449 | 5086 | 6015 | 2139 | 1165 |

6. The multiple integral computing system of claim 1 wherein there is further provided branch condition multiplexer means responsive to said instruction decoder means for selecting a branch condition to be applied the multiple integral computing arrangement.

7. The multiple integral computing system of claim 1 wherein there is further provided timing means for defining an instruction cycle during which an instruction is read from said read-only memory means and applied to said bus means.

8. The multiple integral computing system of claim 1 wherein there is further provided opcode register means for storing an opcode during a period of time that said bus means is busy.

9. The multiple integral computing system of claim 1 wherein thee is further provided random access memory means coupled to said arithmetic logic means and said bus means for storing intermediate data from said arithmetic logic means.

10. A method of operating a computing arrangement to solve a multiple integral, the method comprising the steps of:

first storing at respective values addresses in a read-only memory a plurality of predetermined values of p and s for respective approximations;

second storing in said read-only memory a plurality of whole number values $b_1, \ldots, b_N$, and p, where $0<b_1<p, \ldots, 0<b_N<p,$;

third storing in said read-only memory a plurality of function computing instructions for computing functions $G_m(X)$ and $H_m(X)$; and fourth storing in said read-only memory a plurality of execution instructions;

producing an address signal corresponding to a respective address of said read-only memory and applying said address signal to said read-only memory for enabling data to be provided by said read-only memory to a bidirectional data bus;

conducting data in the form of said function computing instructions from said read-only memory to an arithmetic logic unit;

forming in said arithmetic logic unit, from said function computing instructions provided by said read-only memory, a plurality of functions $H_m(X)$, $G_m(X)$, where $H_0(X)=x$, $G_0(X)=1$, and for $m \geq 1$, $H_m(x)$ and $G_m(x)$ are unique polynomials, whereby
$G_m(x) = x^m(1-x)^m$,
$\lambda H_m(x) = h_m \cdot G_m(x) \pi H_m'(X) = h_m \pi G_m(X)$,
$H_m(0) = 0$, and $h_m = (2m+1)!/(m!)^2$;

evaluating in said arithmetic logic unit, in response to a single instruction, both, a value SI, where, $SI =$ -continued $$\sum_{k=1}^{p} F(J_m(kb_1/p), \ldots, J_m(kb_N/p)) \cdot K_m(kb_1/p) \ldots K_m(kb_N/p)$$

and a value Z, where, $$Z = \sum_{k=1}^{p} K_m(kb_1/p) \ldots K_m(kb_N/p),$$

where $J_m(x) = H_m(FRC(x))$, $K_m(x) = G_m(FRC(x))$;
calculating in said arithmetic logic unit, in response to an operation select signal from an instruction decoder, a value SI/Z as the value of the multiple integral, said instruction decoder means being coupled to said bus means, for receiving an instruction from said read-only memory via said bus means;
selecting a source of data and enabling same, in response to said instruction decoder, whereby data from said enabled source of data is transferred to said bus means;
controlling the operation of said arithmetic logic unit in response to said instruction decoder; and
providing addresses to said read-only memory in response to said arithmetic logic unit.

11. The method of claim 10 wherein there is provided the further step of selecting a plurality of values p said value of prelated to the level of approximation (AP) and the number of dimensions (N), in response to said instruction decoder, said values p corresponding substantially to the values;

| AP |   | N = 2 | 3 | 4 | 5 | 6 | 7 | 8 |
|---|---|---|---|---|---|---|---|---|
| 1 | p | 39 | 14 | 89 | 341 | 532 | 211 | 123 |
|   | s | 14 | 3 | 37 | 151 | 87 | 63 | 44 |
| 2 | p | 73 | 52 | 146 | 923 | 855 | 781 | 408 |
|   | s | 27 | 9 | 63 | 196 | 259 | 243 | 127 |
| 3 | p | 119 | 112 | 449 | 1655 | 1745 | 1899 | 1632 |
|   | s | 50 | 31 | 92 | 786 | 373 | 485 | 53 |
| 4 | p | 233 | 209 | 857 | 2462 | 3145 | 2437 | 3655 |
|   | s | 89 | 45 | 188 | 1041 | 948 | 492 | 1877 |
| 5 | p | 389 | 403 | 1050 | 4207 | 6290 | 4201 | 5840 |
|   | s | 115 | 181 | 407 | 888 | 2937 | 1917 | 2253 |
| 6 | p | 900 | 892 | 1785 | 5342 | 7957 | 6553 | 6970 |
|   | s | 251 | 407 | 344 | 473 | 3823 | 2057 | 2979 |
| 7 | p | 1501 | 2331 | 2380 | 5962 | 9389 | 10295 | 14737 |
|   | s | 552 | 988 | 939 | 2881 | 3453 | 2039 | 1045 |
| 8 | p | 2059 | 2943 | 4440 | 7688 | 14209 | 18861 | 19618 |
|   | s | 782 | 1135 | 709 | 2495 | 1864 | 2914 | 1219 |
| 9 | p | 2477 | 3395 | 5856 | 10775 | 32489 | 31028 | 34306 |
|   | s | 915 | 1296 | 1087 | 2831 | 11789 | 6947 | 805 |
| 10 | p | 3466 | 3952 | 7937 | 27775 | 39034 | 48332 | 44738 |
|   | s | 1323 | 1551 | 3449 | 5086 | 6015 | 2139 | 1165 |

12. The method of claim 10 wherein said step of providing addresses the further step of selecting between first and second address registers in response to said instruction decoder.

13. The method of claim 10 wherein there is provided the further step of selecting an address location in a random access memory in response to said instruction decoder.

* * * * *